United States Patent
Timm et al.

(10) Patent No.: US 11,499,941 B2
(45) Date of Patent: *Nov. 15, 2022

(54) EDDY CURRENT PROBE

(71) Applicant: Zetec, Inc., Snoqualmie, WA (US)

(72) Inventors: Steve Timm, Bellevue, WA (US); Evan Lloyd, Fall City, WA (US); Tom O'Dell, Maple Valley, WA (US); Bill Ziegenhagen, Black Diamond, WA (US); Evans Nguyen, Issaquah, WA (US)

(73) Assignee: Zetec, Inc., Snoqualmie, WA (US)

(*) Notice: Subject to any disclaimer, the term of this patent is extended or adjusted under 35 U.S.C. 154(b) by 148 days.

This patent is subject to a terminal disclaimer.

(21) Appl. No.: 16/710,646

(22) Filed: Dec. 11, 2019

(65) Prior Publication Data

US 2020/0191748 A1 Jun. 18, 2020

Related U.S. Application Data

(60) Provisional application No. 62/778,567, filed on Dec. 12, 2018.

(51) Int. Cl.
  *G01N 27/9013* (2021.01)
  *G01N 27/904* (2021.01)
  *G01N 27/90* (2021.01)

(52) U.S. Cl.
  CPC ......... *G01N 27/902* (2013.01); *G01N 27/904* (2013.01); *G01N 27/9006* (2013.01)

(58) Field of Classification Search
  None
  See application file for complete search history.

(56) References Cited

U.S. PATENT DOCUMENTS 6,677,748 B2   1/2004  Hur et al.
9,588,082 B2   3/2017  Pollock et al.
(Continued)

FOREIGN PATENT DOCUMENTS

DE   202013103151 U1   9/2013
EP        2133691 A2   12/2009
KR        10-1131996   3/2012

OTHER PUBLICATIONS

Renato Gracin et al. Detecting of Cracks by Using +Point Eddy Current Probe; International Conference Nuclear Option in Countries with Small and Mee. Opatija, Croatia, 1996; p. 185-192 (Year: 1996).*

*Primary Examiner* — Nasima Monsur

(74) *Attorney, Agent, or Firm* — Snyder, Clark, Lesch & Chung, LLP

(57) ABSTRACT

A flexible eddy current probe for non-destructive testing of a metallic object may include one or more plus-point coils and a flexible printed circuit having first and second parallel sides, third and fourth parallel sides, and a number of adjacent strips. The strips have first and second ends that are contiguous with the first and second parallel sides, respectively. Each of the strips may contain a pair of coils oriented along the length of the strip, a first coil being proximate to the first end and a second coil being proximate to the second end, and each of the coils is configured to excite an eddy current in the metal object or to sense an eddy current. Each of the strips may also be independently flexible from one another. The eddy current sensor array is configured to be scanned over the metal object.

14 Claims, 8 Drawing Sheets

(56) References Cited

U.S. PATENT DOCUMENTS

| | | |
|---|---|---|
| 9,890,947 B2 | 2/2018 | Shim et al. |
| 10,866,213 B2 * | 12/2020 | Wekell ............... G01N 27/9006 |
| 2004/0066191 A1 | 4/2004 | Hils et al. |
| 2004/0245997 A1 * | 12/2004 | Plotnikov ............ G01N 27/904 |
| | | 324/529 |
| 2009/0009162 A1 * | 1/2009 | Nishimizu ......... G01N 27/9006 |
| | | 324/238 |
| 2010/0007342 A1 * | 1/2010 | Lepage ................ G01N 27/904 |
| | | 324/240 |
| 2013/0193960 A1 | 8/2013 | Nishimizu et al. |
| 2016/0025682 A1 | 1/2016 | Walker et al. |
| 2019/0128846 A1 | 5/2019 | Wekell |

\* cited by examiner

EDDY CURRENT PROBE

RELATED APPLICATION

This application claims priority under 35 U.S.C. § 119 based on U.S. Provisional Application No. 62/778,567 filed Dec. 12, 2018, the contents of which are hereby incorporated herein by reference in their entirety.

BACKGROUND

Eddy current sensors may be used in non-destructive testing of metal objects. An alternating current is applied to an excitation coil placed in close proximity to the metal object under test. The alternating current in the excitation coil induces an alternating current in the object, which can be sensed either by a separate sensor or by the effect of the metal object on the impedance of the excitation coil. The relationship between the applied current and the sensed signal can indicate the integrity of the object under test and reveal problems such as original manufacturing imperfections, weld integrity, corrosion and wear-related weaknesses.

Eddy current testing of a large conductive surface may be made using an array of coils that scan the surface in one or more swaths. The coils may be arranged in rows perpendicular to the scan direction to inspect larger swaths or portions of the surface area of the object.

The material under test can be flat or it can have a complex shape or curvature, such as that found in a raised weld bead. One particularly difficult geometry is found in a butt or tee weld joint. One common area of defect is the joint between the weld and the base material, which is called the toe of the weld. Eddy current excitation coils need to be close to the material under test for good flaw detection and signal quality and the weld toe is difficult to access with known probes.

DETAILED DESCRIPTION OF PREFERRED EMBODIMENTS

Those skilled in the art will recognize other detailed designs and methods that can be developed employing the teachings of the present invention. The examples provided here are illustrative and do not limit the scope of the invention, which is defined by the attached claims. The following detailed description refers to the accompanying drawings. The same reference numbers in different drawings may identify the same or similar elements.

Implementations described herein provide a flexible probe that maintains the probe excitation coils and sensing devices, whether coils or other sensors, close to an object under test even in complex-shaped areas of the object and that can reach the toe area of a raised weld.

Figure 1A:
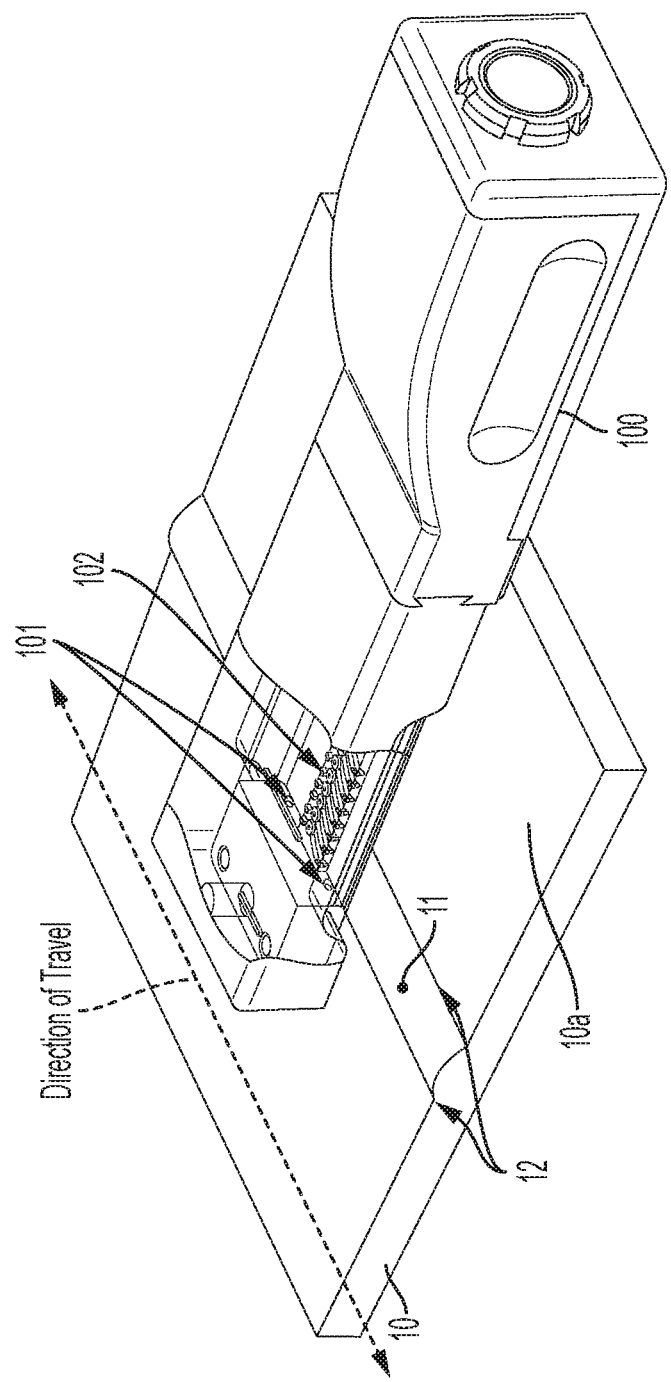
FIG. 1A is an isometric view of an exemplary eddy current probe on a material under test having a raised weld.
Figure 1B:
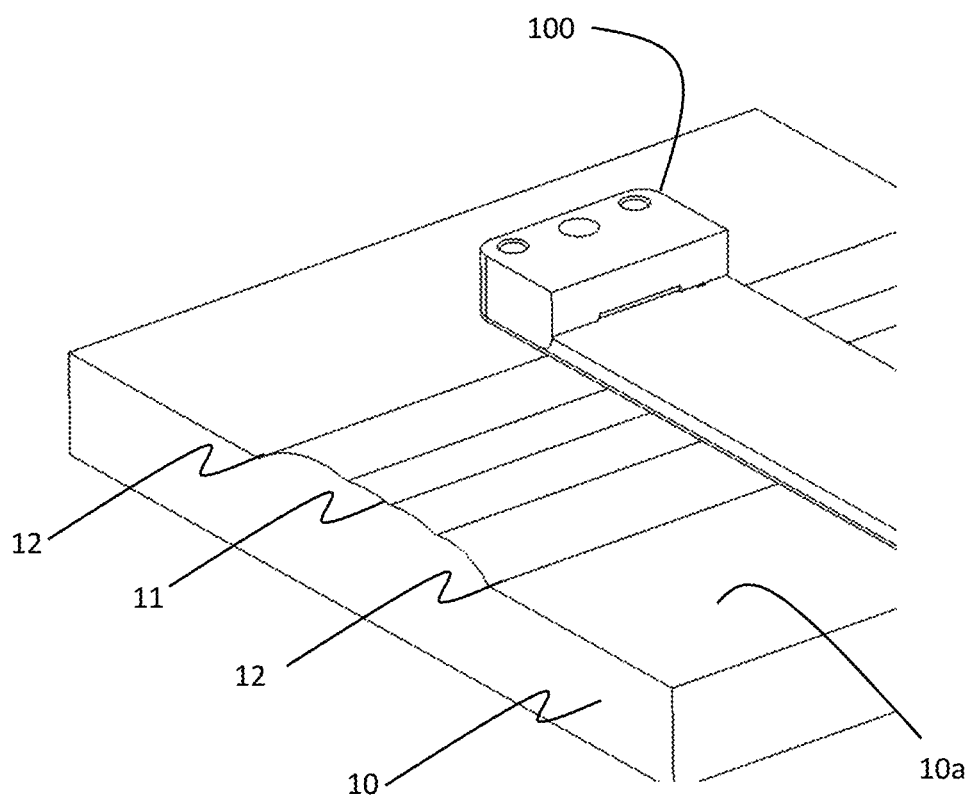
FIG. 1B is a further view of the probe of FIG. 1A on a differently-shaped weld bead.

FIG. 1A shows one exemplary embodiment of an eddy current probe 100 on a welded material under test 10. The material 10 has a raised weld bead 11 and two weld toes 12. The probe 100 has one or more "plus-point" coil pairs 101 shown oriented to cover one weld toe region 12 and an array 102 of pancake coils on a flexible substrate that are arranged over the weld bead 11. The plus-point coils 101 are oriented to closely access the difficult geometry of the weld toe 12 and the array of pancake coils are on a flexible substrate 116 (labeled in FIG. 2) that can conform to the weld bead 11 and the surrounding material under test 10. As shown in FIG. 1A, the probe 100 is scanned over a weld in a direction of travel such that the array of pancake coils is substantially perpendicular to the length of the weld. FIG. 1B is a further view of the probe 100 of FIG. 1A on a differently-shaped weld bead 11.

Figure 2:
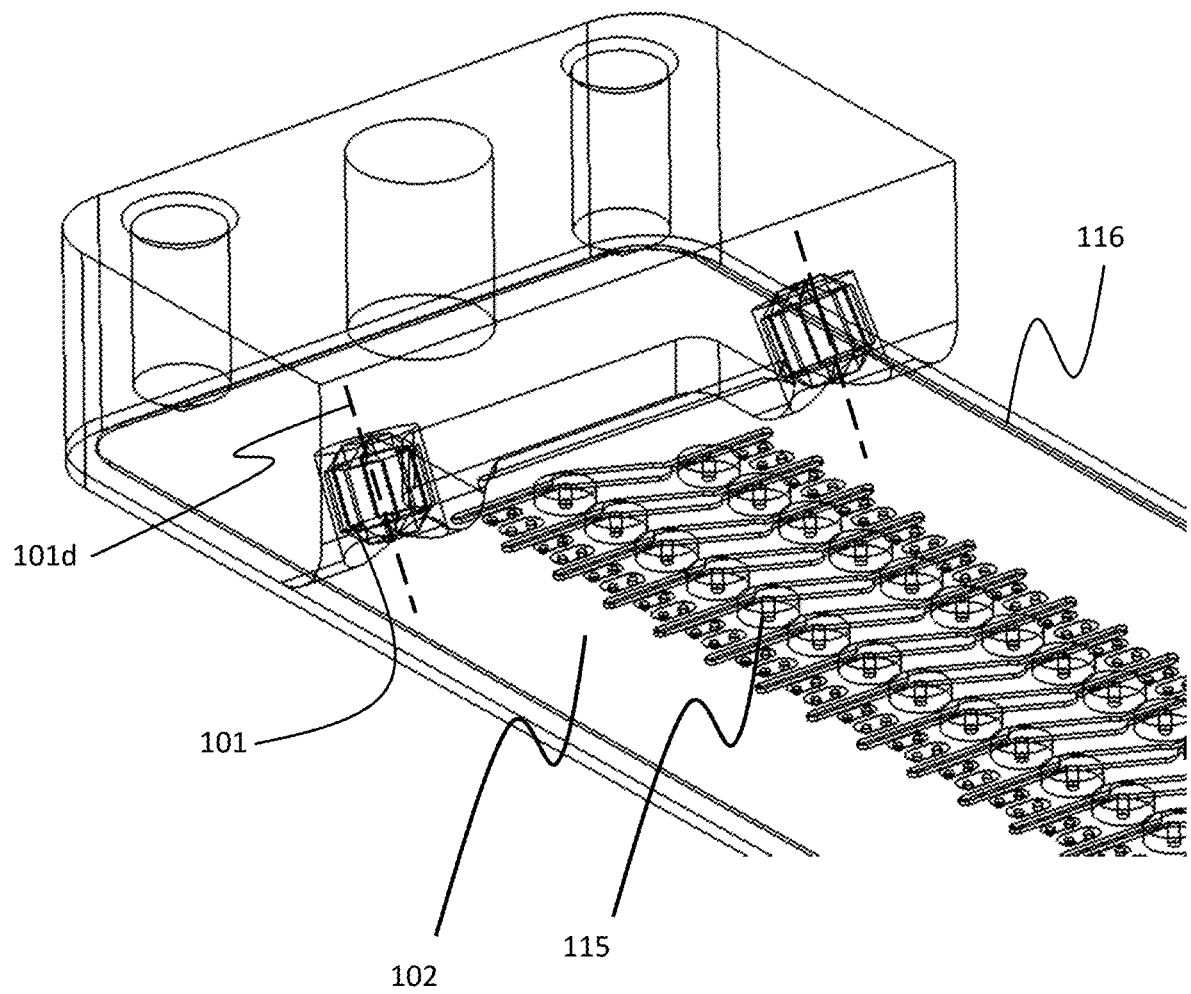
FIG. 2 is an isometric view of a coil array and plus-point coils of the probe of FIG. 1A.

FIG. 2 shows an internal view of the exemplary embodiment in FIG. 1A of the eddy current probe 100 having one or more plus-point coil pairs 101 and an array 102 of pancake coils 115 on a flexible substrate 116. The plus-point 101 and pancake coils 115 function independently. The plus-point coils 101 are shown with their orientation axis 101d arranged to inspect a weld toe 12 with the probe 100 positioned with the pancake coils 115 over the weld bead 11. In a further aspect of the invention, the plus-point coils 101 may be arranged with their orientation axes 101d arranged to inspect weld toe with the probe 100 positioned so that the pancake coils 115 are not over the weld bead 11, but over the flat surface 10a of the item to be inspected 10. The pancake coils 115 are well-suited for covering most of the inspection zone, however they do not perform well with respect to the weld toe 12. The plus-point coil pairs 101 are less subject to lift-off variation and therefore perform well in the toe region of welds 12.

In a further embodiment of a probe suitable for inspection of raised bead welds, an array of plus-point coils is used instead of the pancake coils on the flexible substrate. Plus-point coils are typically much more expensive than pancake coils, thus making an embodiment of a probe using an array of plus-point coils less commercially practical in some scenarios. The hybrid approach of combining plus-point coils to access the weld toe and an array of pancake coils for the remainder of the probe provides a better balance of cost and performance in most scenarios.

Figure 3:
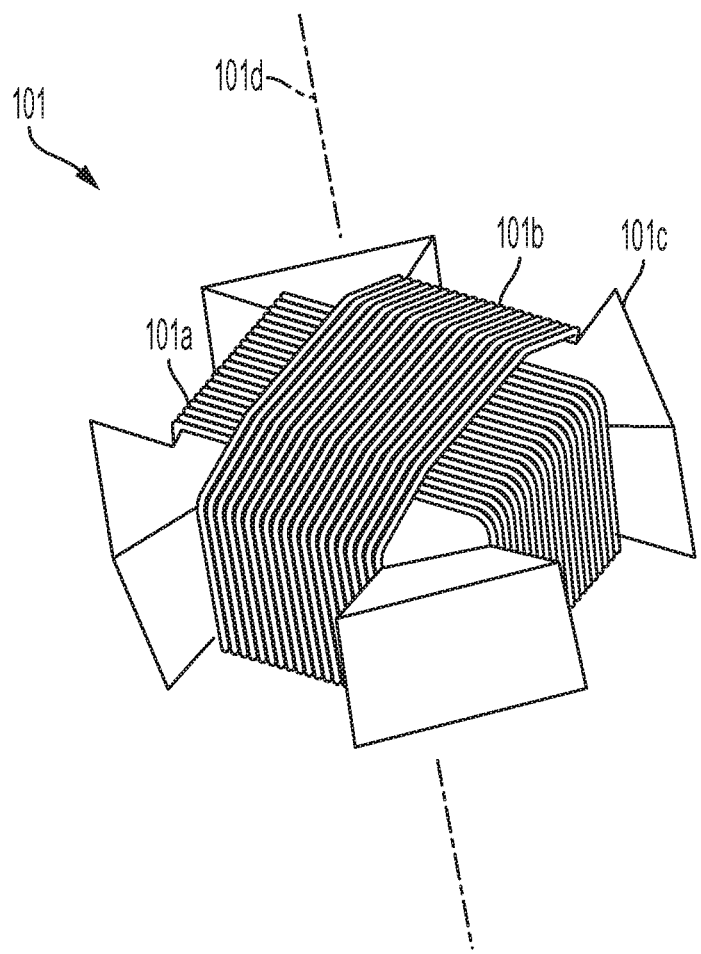
FIG. 3 is an exemplary plus-point coil pair.

FIG. 3 shows one exemplary embodiment of a plus-point coil pair 101. A plus-point coil pair 101 is configured with two coils 101a, 101b oriented at 90° to each other and arranged on a common bobbin 101c. The plus-point coil pair 101 has an orientation axis 101d. The coil pair 101 is oriented so that the orientation axis 101d is orthogonal to the material under test. The pair of coils 101a, 101b interrogate the same spatial area on the material under test. This configuration is generally insensitive to extraneous factors and most effective for detection of cracks and other surface material discontinuities. These operational characteristics permit the suppression of localized geometry variations (curved surfaces, corners, weld splatter) and variations in material composition (filler metals, heat-affected zone). Plus-point probes are less sensitive to permeability changes as well and can therefore be employed on both ferromagnetic and non-ferromagnetic materials. Plus-point probes tend to suppress unwanted noise and exhibit enhanced sensitivity to the detection of surface-breaking cracks.

In one implementation, the plus-point coils 101 are arranged in the probe 100 with their orientation axis 101d at an acute angle, such as about 45°, to the surface of the material under test. This orientation provides the plus point coils with the ability to efficiently inspect the weld toe 12. Other angles of orientation may also be used depending on the types of welds to be inspected and the types of materials under test or to allow the probe 100 to be positioned with the pancake coils 115 not over the weld bead, but over the flat surface 10a of the item under inspection. In a further embodiment, the angle of orientation of the plus-point coils 101 is adjustable. The adjustment of orientation of the plus-point coils 101 may be via a manual adjustment such as a set screw, or may be automated with a small actuator.

Figure 4:
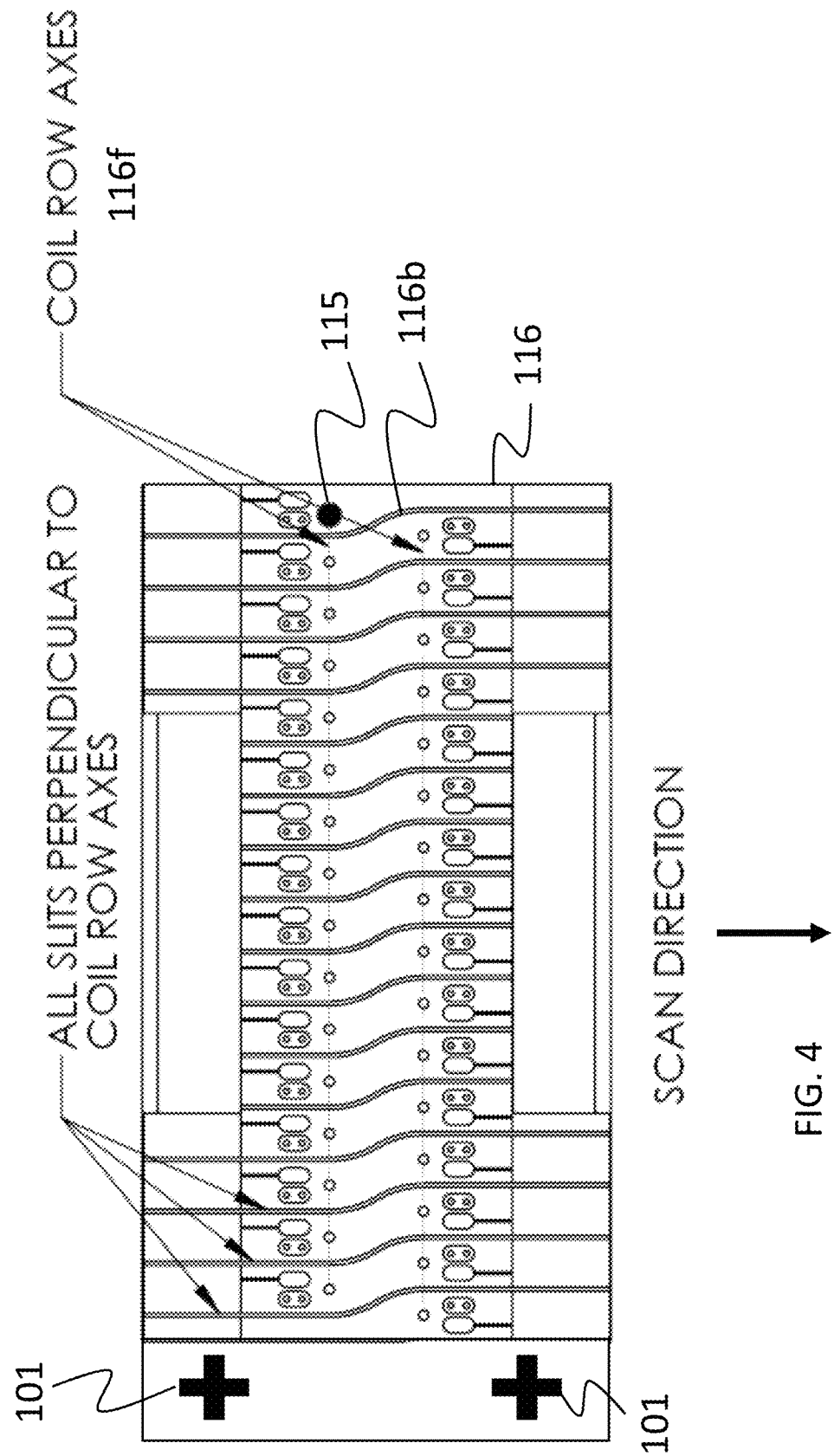
FIG. 4 is a top view of an exemplary flex circuit.

Consistent with embodiments described herein and shown in FIG. 4, a flexible substrate 116, also referred to as a flex circuit 116 is utilized for ease of assembly and low cost of construction. Exemplary details of flex circuit 116 are described in additional detail below. In this exemplary embodiment, 32 pancake sensor coils 115 (only one shown for simplicity) are mounted on and electrically connected to the flex circuit 116. In other embodiments more or less pancake coils 115 may be used. In the implementation shown, two plus-point coil pairs 101 are mounted on the flex circuit 116. The plus-point coils 101, because they do not have to be located on an area that flexes, may also be mounted on a separate circuit board or mounted in probe 100 by other means. Implementations are also not limited to the use of pancake coils as current sensors on the flex circuit 116. For example, anisotropic magneto-resistive sensors, giant magneto-resistive sensors and Hall Effect sensors may all be used to sense current instead of pancake coils 115.

Figure 7:
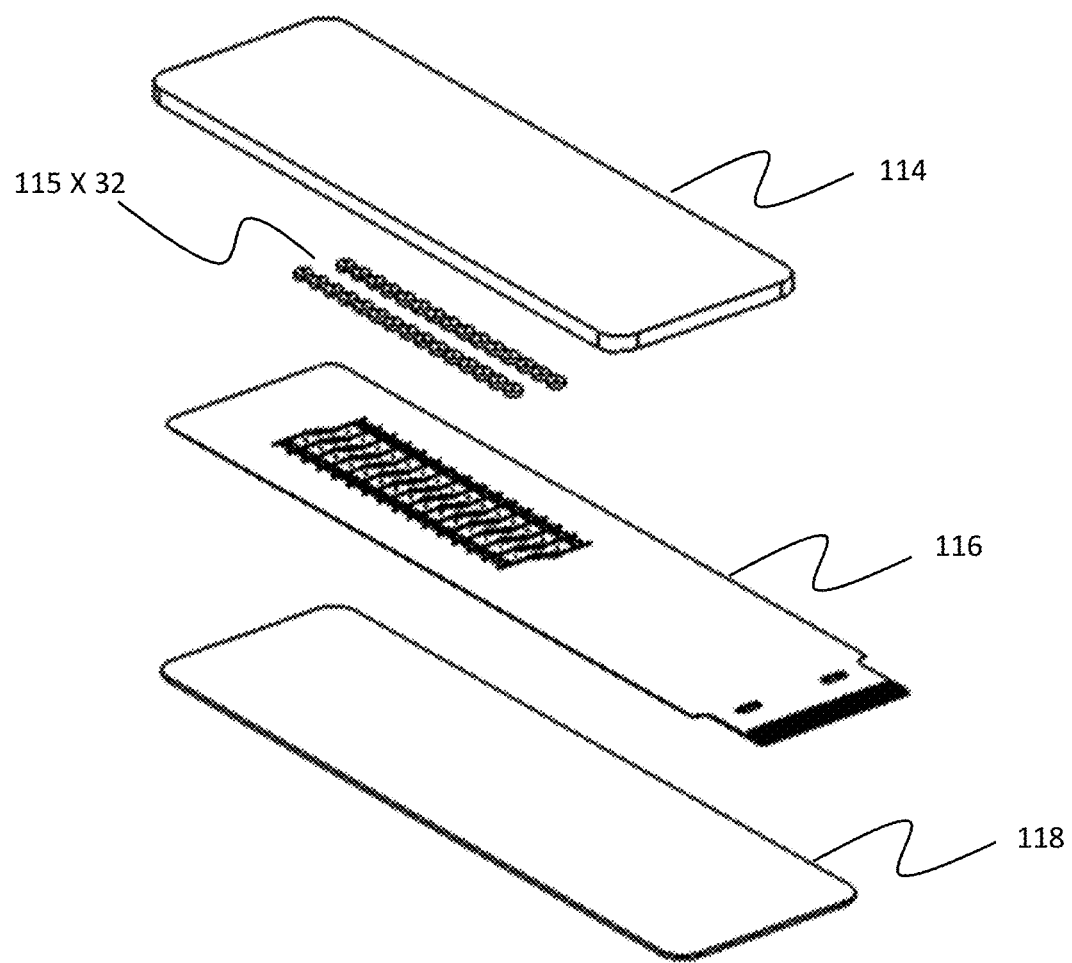
FIG. 7 is an isometric view of an exemplary flex coil array portion of the probe of FIGS. 1A, 1B and 2.

As shown in FIG. 7, a foam coil support 114 may be located above flex circuit 116. The foam coil support 114 provides structural support to flex circuit 116 to stiffen the flex circuit 116 and limit flexure, while allowing flex circuit 116 to bend to confirm to the shape of the object being tested. Eddy current probe 100 also includes a flexible wear surface 118 (also referred to as a flexible pad) that protects the flex circuit 116 and that can be replaced when worn out. The eddy current probe 100 is designed to slide while in contact over the object to be tested, which may involve considerable friction and rough areas over which the wear surface 118 passes. Thus, the wear surface 118 is designed to be replaceable.

Figure 5A:
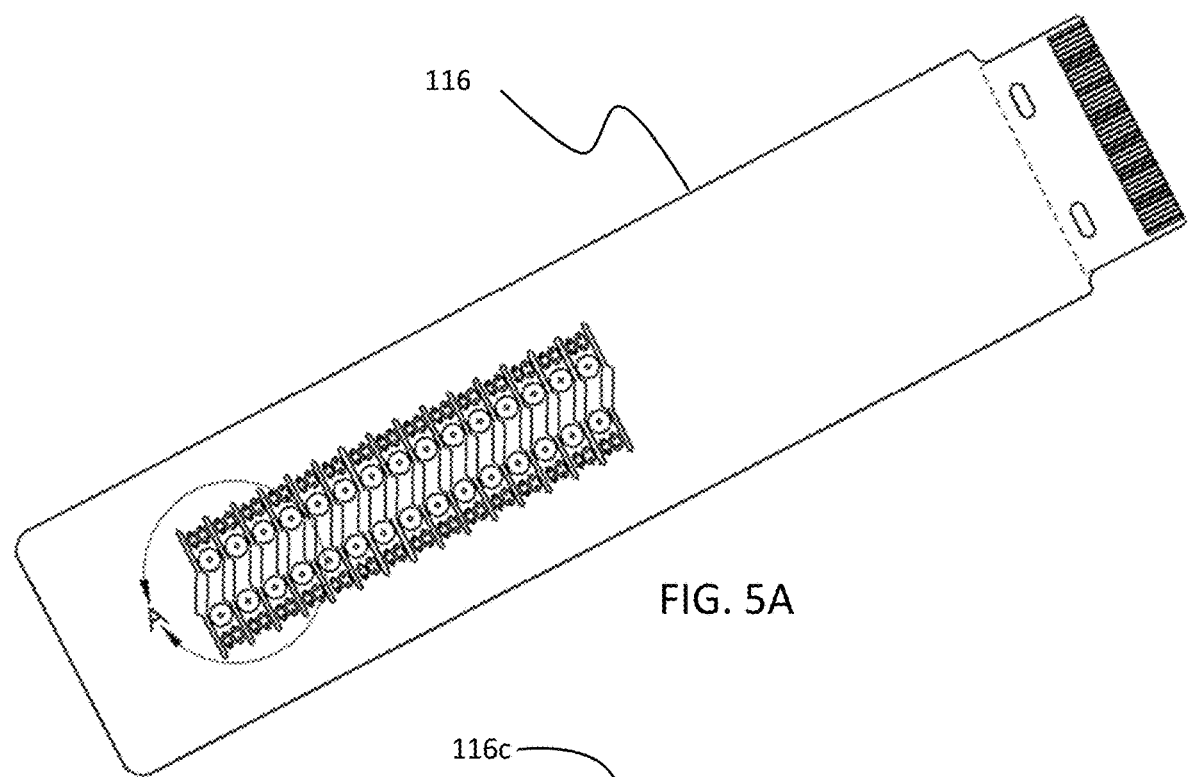
FIG. 5A is an isometric view of an exemplary flex circuit.

In one implementation, the flex circuit 116 may be composed of a laminate of conductive traces, typically of copper and insulating layers typically of a polyimide film. The flex circuit 116 may be substantially rectangular (e.g., includes first and second opposing, parallel sides and third and fourth opposing parallel sides) and may include a plurality of adjacent strips 116a shown in FIG. 5A, with each strip 116a being configured to hold and connect to one or two sensor coils 115. Consistent with implementations described herein, flex circuit strips 116a may be made by laser cutting or other means to form elongate slits 116b in the flex circuit 116. These slits 116b isolate the strips 116a and coils 115 on the strips to independently suspend them. The coils 115 may be separate parts, such as bobbin wound coils applied to the flex circuit 116 or may be built integrally by the flex circuit 116 traces themselves. The orientation of the slits 116b, perpendicular to the coil row axes 116f, provides greater flexibility between the coils, allowing the coils 115 freedom to follow the surface of the object under test more closely as the sensor head 100 is moved across the object under test.

Figure 5B:
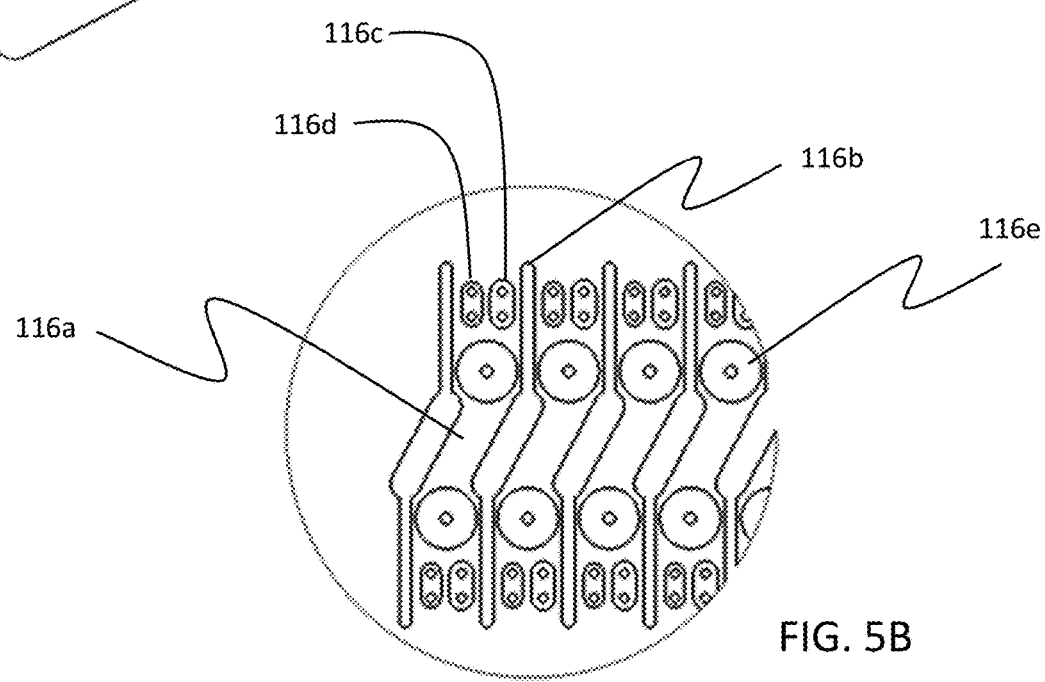
FIG. 5B is a detailed view of portion A of the exemplary flex circuit of FIG. 5A.

As described above, the interdigitated surface of the flex circuit 116 is backed by foam coil support 114, which may be formed of a compliant plastic foam (e.g., Poron®, available from Rogers Corp., Woodstock Conn.). Foam coil support 114 (also described herein as a flexible pad) communicates the force of the probe 100 being held against the object under test to the flex circuit 116 and coils 115. The plurality of strips 116a that independently flex make the probe 100 especially useful in testing welded pipe that may include a raised bead 11 and weld toes 12, as shown in FIG. 1. Each strip 116a is free to conform to the portion of the pipe or weld section against which it is placed without affecting the position of adjacent strips. This places the sensor coils 115 as close as possible to the pipe and weld. FIG. 5B is a detailed diagram of portion A of FIG. 5A and shows exemplary ground pads 116c and a signal pads 116d for connecting to discrete coils, which may be located at coil locations 116e.

Figure 6:
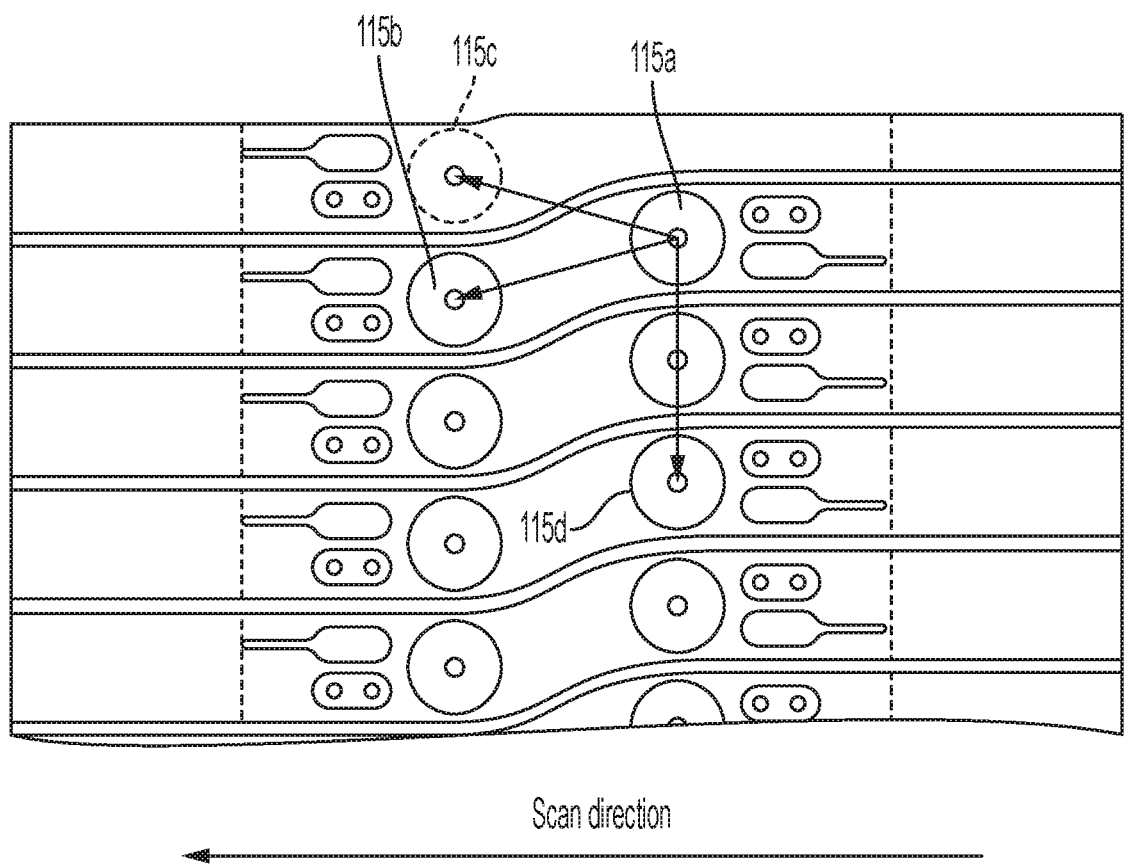
FIG. 6 is a detailed view of the exemplary flex circuit of FIGS. 4, 5A and 5B, including sensor coils.

In an exemplary embodiment, the slits 116b in the flex circuit 116 are configured in a Z shape or curved shape with the two coils 115 on each strip 116a being offset from each other with respect to the coil row axes 116e, as best seen in FIGS. 5B and 6. One reason for the Z shape or curved shape is to place the coils 115 such that three coils 115b, 115c, 115d that may be used as sense coils are equidistant from a fourth coil 115a that may be used as an excitation coil. Placing a plurality of sense coils at different relative angles to the excitation coil with respect to the scan direction increases the ability of detecting flaws, because some flaw orientations may be missed with only a single excitation/sense coil pair having a single orientation with respect to the scan direction. Arranging the sense coils 115b, 115c and 115d equidistant from the drive coil 115a simplifies the ability to compare readings between the sense coils.

To limit the complexity of the instrument that the probe 100 connects to and the connecting cable between the two pieces of equipment, the eddy current probe 100 may include a multiplexer that combines a plurality of coil signals onto a smaller set of wires. By reducing the number of wires in the connector and cable, reliability is increased and the device is easier to use because the connecting cable is less bulky than if individual wires were used for each coil. In a further embodiment, the eddy current signals are digitized at the probe 100 and sent to a probe controller instrument digitally. Likewise, coil energization signals may be sent from the instrument to the probe in digital form and coded and de-multiplexed at the probe by a demultiplexer into a plurality of analog coil energization signals.

In some embodiments, flex circuit 116 may not be durable enough to withstand repeated abrasion against potentially rough metal surfaces under test (e.g., welds, etc.). To provide an acceptable product life for the probe 100, wear surface 118 is placed between the flex circuit 116 and the material under test, as described briefly above with respect to FIG. 7. Consistent with embodiments described herein, wear surface 118 may be formed of a protective and flexible material that enables allow the fingers 116a of the flex circuit 116 to move freely and place the coils 115 in close proximity to the material under test. By not bonding the wear surface 118 directly to the flex circuit 116, the two components act independently and reduce stiffness. This contributes to maximum flexibility, reduced coil lift off and better eddy current signal quality.

Having a wear surface 118 that is separate from the flex circuit 116 also allows the wear surface 118 to be easily replaced. High flexibility and durability are particularly desirable when inspecting welds and other harsh or abrasive surfaces. A variety of materials may be used as a wear surface, including plastic films and fabrics. In a preferred embodiment, a fabric having a surface composed of small guard plates that substantially increase the wear resistance may be used. An exemplary such fabric is available from Superfabric, Oakdale Minn.

In a further implementation, there is only a single row of sensors on the flexible strips, instead of the pair of coils described above. Such an implementation may be used where only the plus-point coils are used for excitation. The single row of sensors may be comprised of any of the aforementioned sensor types.

Although an exemplary flexible eddy current probe is described above for use with in inspecting a weld such as a pipe weld, it should be understood that the embodiments described herein may have applicability in a variety of devices and with a number of different types of welds.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An eddy current sensor array for non-destructive inspection of a metal object comprising:
   one or more plus-point coils; and
   a flexible printed circuit arranged in a substantially rectangular configuration having first and second parallel sides, third and fourth parallel sides, and a plurality of adjacent strips arranged in a first plane and having first and second ends, said first and second ends being contiguous with said first and second parallel sides, respectively,
   each of said strips having a length and a width, wherein the length is greater than the width, and
   each of said strips containing a pair of coils oriented along the length of the strip, the pair of coils including a first coil being proximate to said first end and a second coil being proximate to said second end, each of said coils being configured to excite an eddy current in the metal object or to sense said eddy current, wherein the first and second coils are located on the same strip,
   each of said strips being independently flexible from one another, and
   wherein said eddy current sensor array is configured to be scanned over the metal object in a direction orthogonal to said first and second parallel sides such that the plurality of adjacent strips are moved in a direction corresponding to the orientation of the length of the strips when the eddy current sensor array is scanned over the metal object.

2. The eddy current sensor array of claim 1, further comprising a foam coil support that engages at least a portion of a first face of said flexible printed circuit, said foam coil support providing support for said strips when said strips are flexed by contact with the metal object.

3. The eddy current sensor array of claim 2, further comprising a flexible wear surface located adjacent a second face of said flexible printed circuit and configured for direct contact with the metal object.

4. The eddy current sensor array of claim 1, wherein said first and second ends of said strips are offset with respect to each other such that said first coil is approximately equidistant from said second coil and to a third coil attached to a second end of an adjacent strip of the flexible printed circuit.

5. The eddy current sensor array of claim 1, wherein said first and second ends of said strips of the flexible printed circuit are offset with respect to each other such that said first coil is equidistant from said second coil and to a third coil attached to a second end of an adjacent second strip of the flexible printed circuit and to a fourth coil attached to a first end of a third strip of the flexible printed circuit material, which is adjacent to said second strip.

6. The eddy current sensor array of claim 1, further comprising:
   a plurality of electrical contacts located along one or both of said first and second parallel sides of said flexible printed circuit.

7. The eddy current sensor array of claim 1, wherein said first and second coils are bobbin coils attached to said flexible printed circuit.

8. The eddy current sensor array of claim 1, wherein said first and second coils are formed integrally on said flexible printed circuit.

9. The eddy current sensor array of claim 1, further comprising:
   a multiplexer configured to combine a plurality of signals produced by said coils in response to an eddy current in the metal object.

10. The eddy current sensor array of claim 1, further comprising:
    a demultiplexer configured to output a plurality of drive signals to drive a portion of said coils.

11. The eddy current sensor array of claim 1, wherein said plus-point coils are oriented at an acute angle to said first plane.

12. The eddy current sensor array of claim 11, wherein said acute angle is approximately 45 degrees to said first plane.

13. The eddy current sensor array of claim 1, wherein said plus-point coils comprise an orientation axis and said plus point coils are adjustably mounted in said array so that said orientation axis may be adjusted.

14. An eddy current sensor array for non-destructive inspection of a metal object comprising:
    one or more plus-point coils; and
    a flexible printed circuit arranged in a substantially rectangular configuration having first and second sides, third and fourth sides, and a plurality of adjacent strips arranged in a first plane,
    each of said strips containing a pair of coils, wherein each of said strips has a length and a width, wherein the length is greater than the width, the pair of coils including a first coil proximate to a first end of the strip and a second coil proximate to a second end of the strip, each of the coils being configured to excite an eddy current in the metal object or to sense the eddy current, wherein the first and second coils are located on the same strip,
    each of said strips being independently flexible from one another, and wherein said eddy current sensor array is configured to scan the metal object in a direction substantially orthogonal to said first and second sides such that the plurality of adjacent strips are moved in a direction corresponding to the orientation of the length of the strips when the eddy current sensor array scans the metal object.

\* \* \* \* \*